May 9, 1933.  R. KELLER  1,908,428
ELECTRIC CURRENT REGULATOR
Filed Feb. 7, 1931
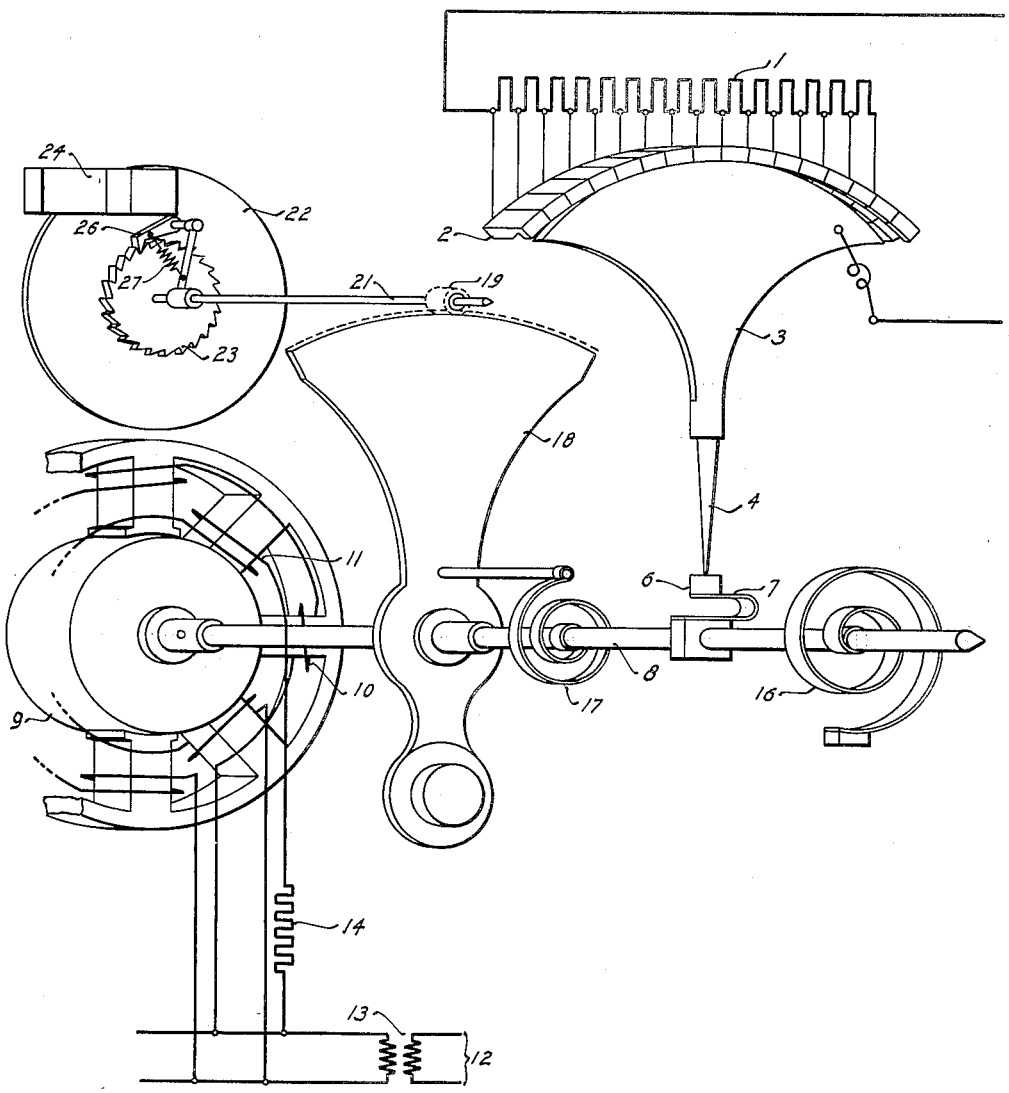
Inventor
Robert Keller
By (signature)
Attorney Patented May 9, 1933

1,908,428

UNITED STATES PATENT OFFICE

ROBERT KELLER, OF ENNETBADEN, SWITZERLAND, ASSIGNOR TO AKTIENGESELL-SCHAFT BROWN, BOVERI & CIE., OF BADEN, SWITZERLAND, A JOINT STOCK COMPANY OF SWITZERLAND

ELECTRIC CURRENT REGULATOR

Application filed February 7, 1931, Serial No. 514,160, and in Germany February 8, 1930.

This invention relates to improvements in regulators and particularly to regulators used to control the excitation of synchronous alternating current machines.

When synchronous machines fall out of synchronism, it is well-known that re-synchronization cannot be obtained except when the excitation of the machine is slowly increased particularly when the machines are used as synchronous condensers operating without separate prime movers. In case of a short-circuit in the circuit, the decrease in speed of such machines depends particularly on the excitation of the machine because, at that moment, the machine starts to operate as a generator. The action of the short circuit should therefore be decreased as much as possible by decreasing the excitation to keep the speed drop at its minimum and thereby to facilitate re-synchronization. The excitation must then be slowly increased to obtain the most advantageous condition for re-synchronization.

It is, therefore, among the objects of the present invention to provide an electrical regulating device which will rapidly decrease the excitation of a synchronous operating alternating current machine and will slowly increase the excitation of a machine when the same is to be re-synchronized.

Another object of the invention is to provide a regulator which will operate in a different manner in the two directions of rotation.

Another object of the invention is to provide a regulator which is provided with damping means operating to damp the movement of the rotatable portions in one direction and which means are inoperative in the other direction.

Objects and advantages, other than those above set forth, will be apparent from the following description when read in connection with the accompanying drawing which somewhat schematically illustrates those portions of a regulator structure relating to the present invention.

Referring more particularly to the drawing by characters of reference, the reference numeral 1 designates a resistance arranged to be connected in the excitation circuit of a synchronous machine (not shown) to be controlled. The several steps of the resistance 1 are connected with contact blocks 2 which are arranged on an arc of a circle and over which a contact sector 3 moves thereby connecting more or less of resistance 1 into the excitation circuit dependent on the position of the contact sector 3.

The contact sector 3 terminates in a hardened needle point 4 which rests in a jewelled cup 6 supported by a spring 7 secured to a shaft 8. The shaft 8 is rotatable by an armature 9 acting under the influence of the magnetic field of coils 10 and 11 supplied with current from the bus bars 12 of the system through a potential transformer 13. One set of the coils, namely the coils 11 have connected in their circuit a resistance 14 so that the coils 10 are connected in a circuit composed mostly of reactance and the coils 11 are connected in a circuit composed mostly of resistance for the purpose of producing a torque on the armature 9 as is well-known. The armature 9 acts against a return spring 16 fastened at one end to the shaft 8 and at the other end to the casing (not shown) of the regulator. Due to the fact that a certain torque on the armature corresponds to a certain energization of the coils, it is possible to so adjust spring 16 that contact sector 3 will rest on contacts 2 to connect portions of resistance 1 with the voltage applied to coils 10, 11. It is to be understood that two or more contact sectors may be arranged about spindle 8 in a similar manner so that the pressures thereof balance each other thereby obtaining a nearly frictionless movement and maintaining an adequate and uniform contact pressure on the contact block 2.

The movement of shaft 8 and contact sector 3 is damped by a damping disc 22 through a spring 17 which is secured at one end to the shaft 8 and, at the other end, is connected with a gear sector 18 journaled on shaft 8. The gear sector 18 is in engagement with a gear pinion 19 mounted on a shaft 21. Disc 22 having a ratchet wheel 23 secured thereon is loosely supported on shaft 21 and is under the magnetic damping action of a magnet 24. A pawl 26 mounted on the shaft 21 is arranged to engage with and latch ratchet 23, under the action of a spring 27, in one direction of rotation while the disc 22 and ratchet 23 may turn freely in the other direction of rotation.

The rate of rotation of contact sector 3 by armature 9 in a clockwise direction is thus regulated by the damping action of magnet 24 on disc 22 which action is transmitted through ratchet 23 and pawl 26 to shaft 21 and gear 19. Gear 19 engaging with gear sector 18 transmits the damping action through spring 17 to shaft 8. During clockwise rotation of armature 9 and contact sector 3, spring 16 is stressed thereby providing a force capable of returning contact sector 3 to its neutral or original position when the magnetic forces acting on armature 9 cease. Upon cessation of the torque tending to rotate armature 9 in a clockwise direction, spring 16 rotates shaft 8 and sector 3 in a counter-clockwise direction without the intervention of any damping action excepting that due to stressing of the spring 17, for the reason that pawl 26 slides over the teeth of ratchet 23 thereby releasing disc 22 from shaft 21. The regulator therefore operates at different rates of speed in the different directions of rotation.

Although but one embodiment of the present invention has been illustrated and described, it will be apparent to those skilled in the art that various changes and modifications may be made therein without departing from the spirit of the invention or from the scope of the appended claims.

The invention claimed is:

1. In a device for regulating dynamo-electric machines, a variable resistance, a contact member movable in one and another directions to thereby vary the effective amount of said resistance, a shaft resiliently supporting and operating said member in the said one and another directions of movement, electro-magnetic means subject to variable energization and operative thereupon to actuate said shaft to cause movement of said member in the said one direction only to thereby vary the effective amount of said resistance in extent in dependence upon the degree of energization of said means, dampening means resiliently connected with said shaft operative responsive to and upon occurrence of energization of said electro-magnetic means to limit the rate of movement of said member in the said one direction, and spring means operative to actuate said shaft to cause movement of said member in the said another direction independently of said dampening means.

2. In a device for regulating dynamo-electric machines, a variable resistance, a contact member movable in one and another directions to thereby vary the effective amount of said resistance, a shaft resiliently supporting and operating said member in the said one and another directions of movement, electro-magnetic means subject to variable energization and operative thereupon to actuate said shaft to cause movement of said member in the said one direction only to thereby vary the effective amount of said resistance in extent in dependence upon the degree of energization of said means, dampening means resiliently connected with said shaft operative responsive to and upon the occurrence of energization of said electro-magnetic means to limit the rate of movement of said member in the said one direction, and spring means operative to actuate said shaft to cause movements of said member in the said another direction to extent and in dependence upon the degree of energization of said electro-magnetic means and independently of said dampening means.

3. In a device for regulating dynamo-electric machines, a variable resistance, a contact member movable in one direction to increase the effective amount of said resistance and in another direction to decrease the effective amount of said resistance, a shaft resiliently supporting and operating said member in the said one and another directions of movement, electro-magnetic means subject to variable energization and operative thereupon to actuate said shaft to cause movement of said member in the said one direction to thereby increase the effective amount of said resistance in extent in dependence upon the degree of energization of said means, dampening means resiliently connected with said shaft operative responsive to and upon occurrence of energization of said electro-magnet means to limit the rate of movement of said member in the said one direction, and spring means operative to actuate said shaft to cause movement of said member in the said another direction to thereby reduce the effective amount of said resistance to extent and in dependence upon the extent of reduction of energization of said electro-magnetic means, the movement of said member in the said another direction being independent of said dampening means.

4. In a device for regulating dynamo-electric machines, a variable resistance, a contact member movable in one and another direction to thereby vary the effective amount of said resistance, a shaft resiliently supporting and operating the said member in the said one and another directions of movement, electro-magnetic means subject to variable energization and operative thereupon to actuate said shaft to cause movement of said member in the said one direction to thereby vary the effective amount of said resistance in extent in dependence upon the degree of energization of said means, a magnetically damped disc, resilient means connecting said disc with said shaft operative responsive to and upon energization of said electro-magnetic means to actuate said disc to thereby limit the rate of movement of said member in the said one direction, and spring means operative to actuate said shaft to cause movement of said member in the said another direction independently of the dampening action of said disc.

5. In a device for regulating dynamo-electric machines, a variable resistance, a contact member movable in one and another direction to thereby vary said resistance, a shaft resiliently supporting and operating said member in the said one and another directions of movement, electro-magnetic means subject to variable energization and operative thereupon to actuate said shaft to cause movement of said member in the said one direction to thereby vary the effective amount of said resistance in extent in dependence upon the degree of energization of said means, a magnetically damped disc, a gear train, a ratchet and pawl, and a spring operative to resiliently connect said disc operatively with said shaft responsive to and upon occurrence of energization of said electro-magnetic means to cause rotation of said disc to thereby limit the rate of movement of said member in the said one direction of movement thereof, and spring means connected with said shaft operative to cause movement of said member in the said another direction independently of the dampening action of said disc, the said spring means being operative to oppose movement of said member responsive to energization of said electro-magnetic means.

6. In a device for regulating dynamo-electric machines, a variable resistance, a contact member having a normal position, a shaft resiliently connected with and operating said member from and to said normal position to thereby vary the effective amount of said resistance, electrically energized means operative to actuate said shaft to cause movement of said member from said normal position to thereby increase the effective amount of said resistance, a magnetically damped disc, means resiliently connecting said disc with said shaft to be rotated responsive to and upon occurrence of energization of said electrically energized means to thereby limit the rate of movement of said member from said normal position, and spring means operative to return said member to said normal position independently of the dampening action of said disc.

In testimony whereof I have hereunto subscribed my name this 21st day of January A. D. 1931.

ROBERT KELLER.